(12) United States Patent
Kim et al.

(10) Patent No.: US 9,022,164 B2
(45) Date of Patent: May 5, 2015

(54) ELECTRONIC SHIFTING DEVICE OF A VEHICLE

(71) Applicants:Hyundai Motor Company, Seoul (KR); SL Corporation, Nowon-ro 85, Buk-gu (KR)

(72) Inventors: Hyung-Suk Kim, Hwaseong-si (KR); Young-Eon Jung, Gyeongsan-si (KR)

(73) Assignees: Hyundai Motor Company, Seoul (KR); SL Corporation, Daegu (KR)

( * ) Notice: Subject to any disclaimer, the term of this patent is extended or adjusted under 35 U.S.C. 154(b) by 217 days.

(21) Appl. No.: 13/724,236

(22) Filed: Dec. 21, 2012

(65) Prior Publication Data

US 2014/0013890 A1    Jan. 16, 2014

(30) Foreign Application Priority Data

Jul. 11, 2012    (KR) .......................... 10-2012-0075382

(51) Int. Cl.
| | | |
|---|---|---|
| *B60K 17/00* | (2006.01) | |
| *F16H 59/10* | (2006.01) | |
| *F16H 59/02* | (2006.01) | |
| *F16H 61/22* | (2006.01) | |

(52) U.S. Cl.
CPC .......... *F16H 59/105* (2013.01); *F16H 59/0204* (2013.01); *F16H 2061/223* (2013.01)

(58) Field of Classification Search
USPC ......... 180/316, 336; 74/473.1, 743.3, 473.33, 74/473.37; 340/4.42
See application file for complete search history.

(56) References Cited

U.S. PATENT DOCUMENTS

| | | | |
|---|---|---|---|
| 6,707,379 B2 * | 3/2004 | Nagasaka ..................... 340/456 |
| 7,451,670 B2 * | 11/2008 | Ebenhoch et al. ......... 74/473.37 |
| 7,770,486 B2 * | 8/2010 | Morita et al. .............. 74/473.18 |
| 7,900,532 B2 * | 3/2011 | Abel et al. ................. 74/473.18 |
| 8,271,167 B2 * | 9/2012 | Tawara et al. ................... 701/52 |
| 2002/0056334 A1 * | 5/2002 | Fujinuma ..................... 74/473.1 |
| 2003/0033898 A1 * | 2/2003 | Morimoto et al. .............. 74/335 |
| 2003/0172762 A1 * | 9/2003 | Ehrmaier et al. .......... 74/473.33 |
| 2005/0039562 A1 | 2/2005 | Kako et al. |
| 2012/0144948 A1 * | 6/2012 | Kim et al. ................. 74/473.33 |
| 2012/0291579 A1 * | 11/2012 | Kamoshida .................. 74/473.3 |
| 2013/0047768 A1 * | 2/2013 | Kamoshida et al. ......... 74/473.3 |

FOREIGN PATENT DOCUMENTS

| | | |
|---|---|---|
| JP | 5-172221 A | 7/1993 |
| JP | 2010-18211 A | 1/2010 |
| JP | 2012-46098 A | 3/2012 |
| KR | 10-2009-0107940 A | 10/2009 |
| KR | 10-2011-0062880 A | 6/2011 |
| KR | 10-2011-0062888 A | 6/2011 |

* cited by examiner

*Primary Examiner* — Toan To

(74) *Attorney, Agent, or Firm* — Morgan, Lewis & Bockius LLP

(57) ABSTRACT

An operation device of a shift by wire way excludes mechanical connection for transferring operational force between a transmission and an operation device for shifting, which can be used in a vehicle to which an electronic shifting device is mounted. For this purpose, a shift pattern is capable of operating intuitively a shifting device by providing a shift pattern identical to an existing shift pattern and keeping user's experience and at the same time reducing the number of the shift lock to solve the drawback of a prior shift pattern provided with a plurality of shift locks that defines the utilizing of a space, and thereby utilizing a space at a maximum level.

7 Claims, 5 Drawing Sheets

PHSICAL PATTERN          VISUAL PATTERN

FIG. 9

| | CURRENT LEVER STAGE | PHSICAL LEVER STAGE | VEHICLE CONDITION | | LEVER CONDITION | Next SHIFTING STAGE | PHSICAL LEVER STAGE | REMARKS |
|---|---|---|---|---|---|---|---|---|
| | | | Brake Pedal Signal (On/Off) | Vehicle Speed (5km/h or less=ok) | Safety Button (On/Off) | | | |
| 1 | P | Null | On | ok | On | R | R | |
| 2 | | | | | Off | N | Null | |
| 3 | | | | | On | D | Null | |
| 4 | R | R | On | ok | Off | P | Null | P-Button |
| 5 | | | don't care | don't care | Off | N | Null | |
| 6 | | | On | ok | Off | D | Null | |
| 7 | N | Null | On | ok | Off | P | Null | P-Button |
| 8 | | | On | ok | On | R | R | |
| 9 | | | don't care | don't care | Off | D | Null | |
| 10 | D | Null | On | ok | Off | P | Null | P-Button |
| 11 | | | On | ok | On | R | R | |
| 12 | | | don't care | don't care | Off | N | Null | |

ELECTRONIC SHIFTING DEVICE OF A VEHICLE

CROSS-REFERENCE TO RELATED APPLICATION

The present application claims priority of Korean Patent Application Number 10-2012-75382 filed Jul. 11, 2012, the entire contents of which application is incorporated herein for all purposes by this reference.

BACKGROUND OF INVENTION

1. Field of Invention

The present disclosure relates to a device for operating a transmission mounted on a vehicle, and more particularly, to an operation device of a shift by wire way excluding mechanical connection for transferring operational force between a transmission and an operation device for shifting, which can be used in a vehicle to which an electronic shifting device is mounted.

2. Description of Related Art

Generally, in a shifting device mounted on a vehicle a shifting device of a shift by wire way refers to an electronic shift lever configured by receiving electric signal in accordance to a shifting operation of a driver and controlling a transmission with the electric signal, unlike a known transmission controller for transferring the shifting operation of a driver to a transmission through a cable.

A manual transmission of a conventional type according to a prior art is connected directly to a shift lever such that the shift lever is moved to move directly a synchronizer ring of the transmission to be shifted; however, in the shifting device of a shift by wire the shift lever sends electric signal like a switch for a transmission to be operated with electromagnet (solenoid).

FIG. 1 is a view illustrating one shifting pattern among the known shifting device of the shift by wire.

In a case of the known shifting device of the shift by wire (hereinafter, referred to as "electronic shifting device"), it is configured to be returned automatically to a Null stage of a basic shifting stage after shifting to the respective stages. Accordingly, in order to implement a shift pattern identical to an existing shift pattern in accordance to the conditions of the respective shifting stages a shift lock has to be provided for defining an automatic return of a transmission after shifting to the respective stages, and in this case 4 shift locks have to be provided.

However, since 4 shift locks have to be provided in the known electronic shifting device, there is a drawback of utilizing inefficiently a space. That is, the shift lock has to be arranged between the respective shifting stages so that a space on which the shift lock is arranged has to be ensured thereby occupying a large space.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been propose to solve the above drawbacks. Various aspects of the present invention provide for a shift pattern capable of operating intuitively a shifting device by providing a shift pattern identical to an existing shift pattern and keeping user's experience and at the same time reducing the number of the shift lock to solve the drawback of a prior shift pattern provided with a plurality of shift locks that defines the utilizing of a space, and thereby utilizing a space at a maximum level.

Various aspects of the present invention provide for an electronic shifting device that includes a first linear path that is arranged horizontally, on a remote end on side of which a first fixing point is disposed and on a remote end of the other side of which a first temporal point; a second linear path that is extended vertically downward from the first fixing point, on the extended remote end of which a second temporal point is disposed; a third linear path that is extended vertically downward from the first temporal point, on the extended remote end of which a second fixing point is disposed; and a P button that is spaced from the first fixing point and operated separately.

Further, the electronic shifting device of a vehicle may further include operator that is moved along the movement paths; a sensor for recognizing location variations of the operator; and a controller for receiving the location variations of the operator from the sensor and outputting signal to control a transmission in accordance to movement patterns of the operator.

Additionally, the operator may be returned to one of the first fixing point Null and the second fixing point R when external force is released.

Further, the operator may be returned to the first fixing point Null when external force is released while the operator is disposed on the first linear path including the first temporal point N.

In addition, the operator may be returned to the second fixing point R when external force is released while the operator is disposed on the third linear path excluding the first temporal point N.

Meanwhile, shift locks may be provided on the second linear path and the third linear path, respectively, which are controlled by the controller wherein the shift locks define the movement of the operator when they are operated.

Further, the first fixing point may be provided on the first linear path for selecting a Null stage of shifting stages, the first temporal point is provided on the first linear path for selecting a N stage of the shifting stages, the second temporal point is provided on the second linear path for selecting a D stage of the shifting stages, and the second fixing point is provided on the third linear path for selecting a R stage of the shifting stages.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 9 is a table illustrating operational conditions of exemplary shift locks according to the present invention.

Figure 1:
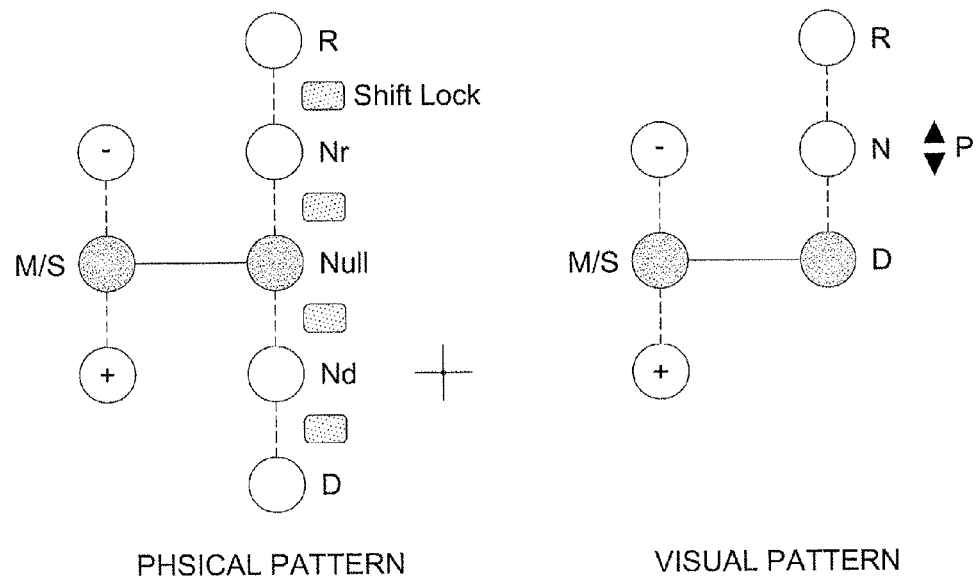
FIG. 1 is a perspective view illustrating a shift pattern, among known shifting devices of a shift by wire.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
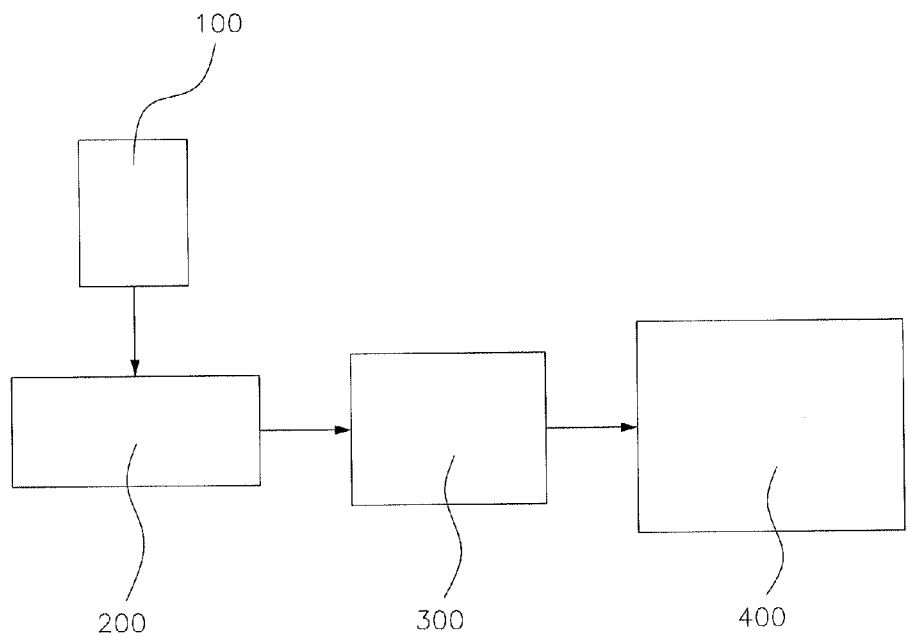
FIG. 2 is a diagram illustrating an exemplary electronic shifting device of a vehicle according to the present invention.
Figure 3:
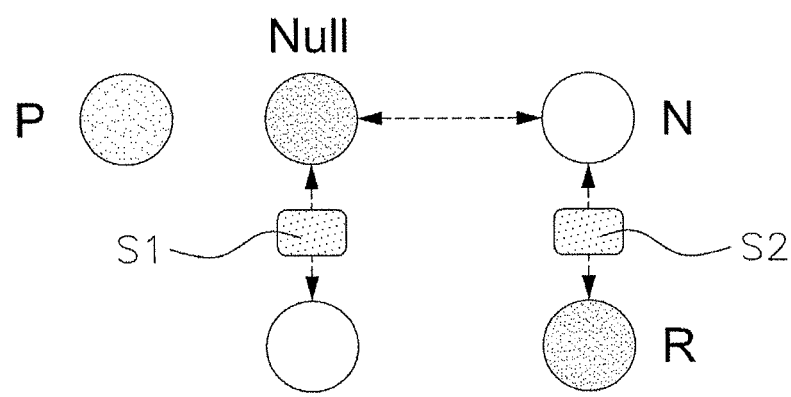
FIG. 3 is a view illustrating a shift pattern of an exemplary electronic shifting device of a vehicle according to the present invention.

FIG. 2 is a diagram illustrating an electronic shifting device of a vehicle according to various embodiments of the present invention, and FIG. 3 is a view illustrating a shift pattern of an electronic shifting device of a vehicle according to various embodiments of the present invention.

Referring to the drawings, an electronic shifting device of a vehicle according to the present invention is provided with a movement path on which a plurality of shifting stages are arranged, including at least one of linear paths 10, 20, 30, and an operator 100 that moves along the linear paths 10, 20, 30. The operator 100 can be operated directly by a driver for a shifting and for example the operator 100 may be a known shift lever.

Further, an electronic shifting device of a vehicle according to the present invention includes a sensor 200 for sensing location variations of the operator 100 moving along the movement path and a controller 300 for receiving sensing information from the sensor 200 and outputting a shifting signal for controlling a transmission 400 in accordance to an operation of the operator 100.

Accordingly, the shifting signal output from the controller 300 by operating the operator 100 is input to the transmission 400 to be shifted.

As shown in FIG. 3, the movement path may include three linear paths 10, 20 30 wherein the remote ends of the linear paths 10, 20, 30 are connected each other and the respective linear paths are vertical to the connected linear path, respectively.

In various embodiments of the present invention, the operator 100 may be formed in the same shape as an existing shift lever wherein a temporal point spaced upward from the pivot point while rotating based on a lower pivot point traces almost a straight line and the operator may be formed to move along the straight line. However, the operator according to the present invention is not limited thereto, and it may be formed with a slider that moves along the straight line.

The plurality of linear paths 10, 20, 30 include a first fixing point Null and a second fixing point R at which the operator can maintain its location so long as external force is not applied to the operator, and temporal points N, D configured such that the operator 100 is moved temporally due to external force and returned automatically to one of the fixing points Null, R. Further, the fixing points Null, R and the temporal points N, D are arranged adjacently each other at both remote ends of the respective linear paths and the linear paths provided with the fixing points Null, R and the temporal points N, D are connected each other at the fixing points Null, R and the temporal points N, D as an intersection point. Accordingly, the operator 100 moves along a movement path formed by connecting the liner paths 10, 20, 30.

At this time, the controller 300 does not recognize that the operator is moved to an efficient location for shifting when the operator 100 is disposed between the fixing points Null, R or the temporal points N, D, which are arranged on both remote ends of the linear paths 10, 20, 30, and thus the controller 300 recognizes that the operator is moved to an efficient location for shifting only when the operator 100 is moved from one of the fixing points Null, R or the temporal points N, D to the other thereof.

Meanwhile, a known elastic member is provided between the fixing points Null, R and the temporal points N, D within the movement paths so that when external force applied to the operator 100 is released, the operator 100 may return to one of the fixing points Null, R.

In various embodiments of the present invention, two fixing points Null, R are present on a movement path along which the operator 100 moves. Accordingly, even when the operator 100 is moved for shifting, the operator returns to one of the first fixing point Null and the second fixing point R when external force is released.

External force may be released while the operator 100 is disposed on a first linear path 10 including the first temporal point N and, and then the operator returns to the first fixing point Null, and further external force is released while the operator 100 is disposed on the third linear path 30 in addition to the first temporal point N, the operator returns to the second fixing point R.

The movement path includes the first linear path 10 provided with the first fixing point Null at one end and the first temporal point N at the other end, the second linear path 20 connected to the first linear path 10 to include the first fixing point Null at one end and provided with the second temporal point D at the other end, and the third linear path 30 connected to the other end of the first linear path 10 to include the first temporal point N provided at the other end of the first linear path 10 at one end and to include the second fixing point R at the other end.

The first linear path 10 may be arranged horizontally such that the first fixing point Null is disposed at one remote end and the first temporal point N is disposed at the other remote end, the second linear path 20 is extended vertically downward from the first fixing point Null and the second temporal point N is disposed at the extended end, and the third linear path 30 is extended vertically downward from the first temporal point N and the second fixing point R is disposed at the extended end. Further, a P button P is spaced from the fixing points so that is can be operated independently.

However, the configurations of the linear paths are not limited thereto, and the first linear path 10, the second linear path 20 and the third linear path 30 can be arranged at a predetermined angle, in addition to a right angle.

Here, the first fixing point Null on the first linear path 10 is a basic stage of shifting stages wherein it is to be fixed when a shifting is not performed, the first temporal point N on the first linear path 10 is provided for selecting the N stage of the shifting stages, the second temporal point D on the second linear path 20 is provided for selecting the D stage of the shifting stages, and the second fixing point R on the third linear path 30 is provided for selecting the R stage of the shifting stages.

In the shift pattern as described-above, a presence of the N stage is based on a regulation of law that the N stage of a neutral stage has to be provided between the D stage of a moving frontward stage and the R stage of a moving rearward stage wherein the shift pattern of the present invention satisfies the regulation.

Meanwhile, in various embodiments of the present invention, the P button P is further provided for selecting a P stage by a separate operation when the operator 100 is disposed on the first fixing point Null and the controller is configured to receive signal in accordance to an operation of the P button P. However, the P button P is not limited thereto, and thus it may be configured as a different type-switch and further it may be provided on other locations in addition to on the operator 100.

Figure 4:
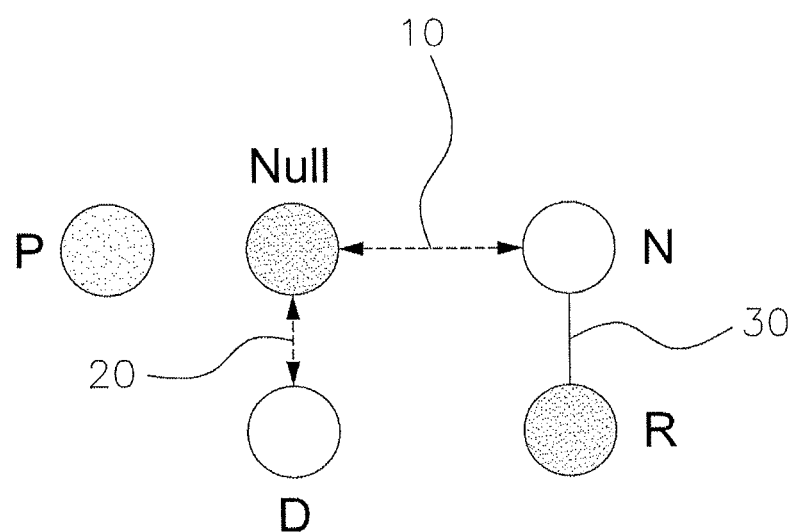
FIG. 4 is a view illustrating a shift lock included in the shift pattern of an exemplary electronic shifting device of a vehicle according to the present invention.

FIG. 4 is a view illustrating a shift lock included in the shift pattern of an electronic shifting device of a vehicle according to various embodiments of the present invention.

In the electronic shifting device of a vehicle according to the present invention, shift locks S1, S2 are provided for preventing misoperation while the operator 100 is moved for shifting and defining the shifting in accordance to a state of a vehicle. That is, the controller 300 controls selectively the shift locks S1, S2 in accordance to the location and the operational state of the operator 100 to define a movement of the operator to a proper range thereby defining unrequested shifting operation not to perform a shifting of producing risk factors in accordance to a vehicle stage.

As shown in drawings, in various embodiments of the present invention, the shift locks S1, S2 are provided on the first linear path 10 and the second linear path 20, respectively. That is, the shift lock of the present invention is provided as a plural of the first shift lock S1 and the second shift lock S2 wherein the first shift lock S1 is arranged between the first fixing point Null and the second temporal point D, and the second shift lock S2 is arranged between the first temporal point N and the second fixing point R.

The controller 300 controls shifting by controlling the shift locks in accordance to conditions of a vehicle such as a safety button and signals of vehicle speed and brake pedal.

Hereinafter, shifting steps by using the electronic shifting device of a vehicle according to the present invention will be described, referring to FIGS. 5 to 8.

Here, the first fixing point Null, the first temporal point N, the second temporal point D and the second fixing point R refer to as a Null stage, a N state, a D stage, and a R stage, respectively for convenience of description.

Figure 5:
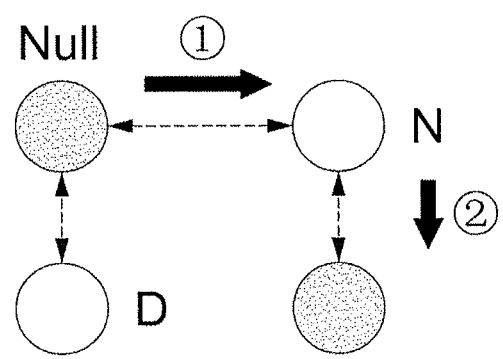
FIG. 5 is a View illustrating movement stages of an operator while shifting to a R stage.

FIG. 5 is a view illustrating movement steps of the operator 100 while shifting to the R stage.

The controller 300 is configured to receive the signal recognized through the sensor that the operator 100 is moving through the N stage for shifting to the R stage from an initial location, i.e., the first fixing point Null, and outputs shifting signal while the operator is disposed at the R stage of the second fixing point R after moving for shifting.

As shown in FIG. 5, the operator 100 is moved to the R stage along the first linear path 10 and the third linear path 30 through the N stage for shifting. At this time, the first linear path 10 and the third linear path 30 are arranged vertically each other and thus a driver has to operate the operator 100 to be moved to the N stage and then to the R stage arranged vertically to the N stage for shifting to the R stage wherein in a situation where the driver wants a shifting to the R stage, the misoperation caused from that the operator 100 is not moved precisely to the R stage can be prevented through this configuration.

Accordingly, a precise shifting without misoperation is possible while a driver does not see the shifting stage, that is, the driver drives a vehicle when the shifting to the R stage that is moved along the first linear path 10 and the third linear path 30 which are arranged vertically each other, is performed.

Meanwhile, as described-above, in the electronic shifting device, the operator 100 outputs signal while it is disposed on the second fixing point R after the operation of shifting to the R stage, and further when external force is released after the operator 100 is moved to the R stage for the shifting, the operator is fixed automatically to the second fixing R stage.

Accordingly, when the driver who applies external force to the operator 100 moves the operator 100 to the N stage and the R stage which is arranged vertically to the N stage, and then releases the external force, the operator 100 is fixed automatically to the nearest fixing point R stage. The controller 300 recognizes that the driver has operated the shifting to the R stage based on the movement of the operator 100 input through the sensor 200 and outputs signal of shifting to the R stage thereby performing the shifting to the R stage in a transmission.

Figure 6:
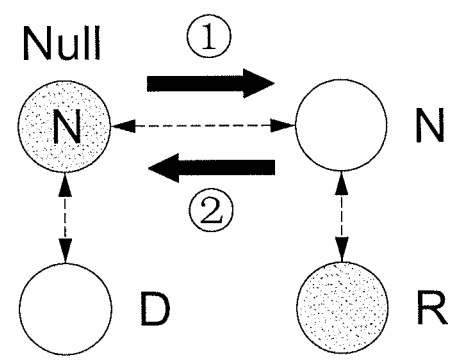
FIG. 6 is a view illustrating movement stages of an operator while shifting to a N stage.

FIG. 6 is a view illustrating movement steps of the operator 100 while shifting to the N stage.

As shown in FIG. 6, the N stage is disposed on the first movement path, like the first fixing point Null and thus the operator 100 moves along the first linear path 10 for shifting to the N stage.

Accordingly, the operator 100 disposed on the Null stage is moved directly from the Null stage to the N stage along the first movement path so that the shifting to the first temporal point N adjacent to the Null stage, i.e., the N stage is performed.

At this time, the operator 100 moved to the N stage outputs signal while the operator is returned to the Null stage after a shifting operation. Accordingly, when the operator 100 is moved to the N stage for shifting and external force is released, the operator is returned to the Null stage, and when the operator 100 finishes its movement to the Null stage, the controller 300 recognizes that a driver has operated the shifting operation based on the movement of the operator input through the sensor 200 and outputs the signal of shifting to the N stage thereby performing the shifting to the N stage in a transmission.

Figure 7:
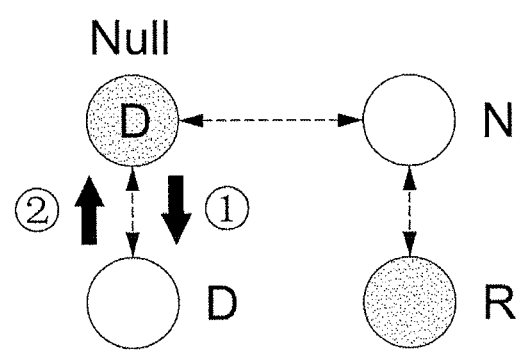
FIG. 7 is a view illustrating movement stages of an operator while shifting to a D stage.

FIG. 7 is a view illustrating movement steps of the operator 100 while shifting to the D stage.

As shown in FIG. 7, the D stage is disposed on the second movement path 20, like the first fixing point Null and thus the operator 100 moves along the second linear path 20 for shifting to the D stage.

Accordingly, the operator 100 disposed on the Null stage is moved directly from the Null stage to the D stage along the second path 20 so that the shifting to the second temporal point D adjacent to the Null stage, i.e., the D stage is performed.

Further, as described-above, in the electronic shifting device of a vehicle, the operator 100 outputs signal while the operator is returned to the Null stage after a shifting operation. Accordingly, when the operator 100 is moved to the D stage for shifting and external force is released, the operator is returned to the Null stage, and when the operator 100 finishes its movement to the Null stage, the controller 300 recognizes that a driver has operated the shifting operation to the D stage based on the movement of the operator input through the sensor 200 and outputs the signal of shifting to the D stage thereby performing the shifting to the D stage in a transmission 400.

Figure 8:
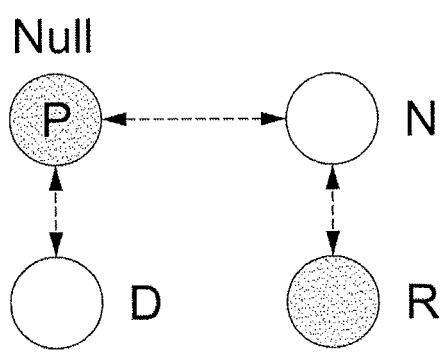
FIG. 8 is a view illustrating movement stages of an operator while shifting to a P stage.

FIG. 8 is a view illustrating movement steps of the operator 100 while shifting to the P stage.

As described-above, in the electronic shifting device of a vehicle, the shifting to the P stage is performed through the P button P of a button type. The shifting to the P stage is operated by an operation of the P button P while the operator 100 is disposed on the Null stage.

Accordingly, when the P button is operated, the controller 300 recognizes that a driver has operated the shifting to the P stage and outputs the signal of shifting to the P stage thereby performing the shifting to the P stage in the transmission 400.

FIG. 9 is a table illustrating operational conditions of other shift locks according to various embodiments of the present invention.

As described-above, in the electronic shifting device of a vehicle according to the present invention, the shift locks S1, S2 are provided on the second linear path 20 and the third linear path 30, respectively, for preventing misoperation of the operator 100. Accordingly, the movement of the operator 100 is defined by the shift locks S1, S2 while the shift locks S1, S2 are operated and thus it is impossible to control the D stage and R stage to which the operator 100 cannot arrive.

The shift locks S1, S2 are operated in accordance with the conditions of a vehicle such as a safety button, signals of vehicle speed and brake pedal, and the shift locks are controlled by the controller.

The shift locks are operated, as shown in FIG. 9, when the operator 100 is disposed on the Null stage or the R stage while the shiftings to the P stage, R stage, N stage and D stage are performed, respectively.

Firstly, when the current shifting stage is the P stage, a brake pedal signal is ON and vehicle speed is 5 km/h or less, it is possible to shift to all of the R stage, N stage and D stage; however when the safety button is OFF, the shift locks S1, S2 are operated and thus it is impossible to shift to the R state and D stage.

Secondly, when the current shifting stage is the R stage, the brake pedal signal is ON, the vehicle speed is 5 km/h or less and the safety button is OFF, it is possible to shift to the P stage and the D stage. However, when the brake pedal signal is not ON, or the vehicle speed is not 5 km/h or less, the shift locks S1, S2 are operated and it is possible to shift only to the N stage.

Thirdly, when the current shifting stage is the N stage, the brake pedal signal is ON, the vehicle speed is 5 km/h or less and the safety button is OFF, it is possible to shift to the P stage, and when the brake pedal signal is ON, the vehicle speed is 5 km/h or less and the safety button is ON, it is possible to shift to the R stage. At this time, a physical location of the operator 100 is at the R stage. However, when the brake pedal signal is not ON or the vehicle speed is not 5 km/h or less, and the safety button is OFF, the second shift lock S2, among the shift locks S1, S2, is operated and thus it is possible to shift only to the D stage.

Fourthly, when the current shifting stage is the D stage, the brake pedal signal is ON, the vehicle speed is 5 km/h or less and the safety button is OFF, it is possible to shift to the P stage, and when the brake pedal signal is ON, the vehicle speed is 5 km/h or less and the safety button is ON, it is possible to shift to the R stage. At this time, the physical location of the operator 100 is at the R stage. However, when the brake pedal signal is not ON or the vehicle speed is not 5 km/h or less, and the safety button is OFF, the second shift lock S2, among the shift locks S1, S2, is operated and thus it is possible to shift only to the D stage.

In the electronic shifting device of a vehicle according to the present invention, all shifting stages are implemented by using a simple shift pattern, in other words, 4 shifting stages Null, N, D, R, 2 shift locks S1, S2 and P button P thereby providing excellent space utility degree. Further, the number of the shift locks is decreased, comparing to the prior shift pattern, thereby saving manufacturing cost.

According to the present invention, an electronic shifting device of a vehicle is provided, capable of operating intuitively a shifting device by providing a shift pattern identical to an existing shift pattern and keeping user's experience and at the same time simplifying shift pattern.

Further, in the electronic shifting device of a vehicle according to the present invention, the utilizing degree is improved thereby saving manufacturing cost and improving price completion by reducing from a plurality of shift locks provided for implementing the prior shift pattern to 2 shift locks to serve same function.

For convenience in explanation and accurate definition in the appended claims, the terms lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electronic shifting device of a vehicle, comprising:
   a first linear path arranged horizontally, on a remote end on side of which a first fixing point is disposed and on a remote end of the other side of which a first temporal point;
   a second linear path extending vertically downward from the first fixing point, on the extended remote end of which a second temporal point is disposed;
   a third linear path extending vertically downward from the first temporal point, on the extended remote end of which a second fixing point is disposed; and a P button spaced from the first fixing point and operated separately.

2. The electronic shifting device of a vehicle of claim 1, further comprising an operator moved along the movement paths;
   a sensor for recognizing location variations of the operator; and
   a controller for receiving the location variations of the operator from the sensor and outputting signal to control a transmission in accordance to movement patterns of the operator.

3. The electronic shifting device of a vehicle of claim 1, wherein the operator is returned to one of the first fixing point and the second fixing point when external force is released.

4. The electronic shifting device of a vehicle of claim 3, wherein the operator is returned to the first fixing point when external force is released while the operator is disposed on the first linear path including the first temporal point.

5. The electronic shifting device of a vehicle of claim 3, wherein the operator is returned to the second fixing point when external force is released while the operator is disposed on the third linear path excluding the first temporal point.

6. The electronic shifting device of a vehicle of claim 2, wherein shift locks are provided on the second linear path and the third linear path, respectively, which are controlled by the controller wherein the shift locks define the movement of the operator when they are operated.

7. The electronic shifting device of a vehicle of claim 1, wherein the first fixing point is provided on the first linear path for selecting a Null stage of shifting stages, the first temporal point is provided on the first linear path for selecting a N stage of the shifting stages, the second temporal point is provided on the second linear path for selecting a D stage of the shifting stages, and the second fixing point is provided on the third linear path for selecting a R stage of the shifting stages.

* * * * *